United States Patent
Kasik et al.

(10) Patent No.: US 10,534,787 B2
(45) Date of Patent: Jan. 14, 2020

(54) REMOTE DATA DELIVERY SYSTEM

(71) Applicant: The Boeing Company, Chicago, IL (US)

(72) Inventors: David Joseph Kasik, Sammamish, WA (US); David D. Briggs, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 14/189,611

(22) Filed: Feb. 25, 2014

(65) Prior Publication Data
US 2015/0242472 A1   Aug. 27, 2015

(51) Int. Cl.
*G06F 16/248*   (2019.01)
*H04L 29/08*   (2006.01)
*G06Q 10/00*   (2012.01)

(52) U.S. Cl.
CPC .......... *G06F 16/248* (2019.01); *G06Q 10/20* (2013.01); *H04L 67/10* (2013.01)

(58) Field of Classification Search
CPC .... G06F 21/55; G06F 17/30289; G06F 21/62; G06F 19/20; G06F 17/30873; G06F 3/04815; G06F 17/30348; G06F 17/21; G06F 16/248
See application file for complete search history.

(56) References Cited

U.S. PATENT DOCUMENTS

| | | | | |
|---|---|---|---|---|
| 9,088,787 | B1 * | 7/2015 | Smith | G06T 19/006 |
| 2008/0307327 | A1 * | 12/2008 | Newcomer | G06T 19/20 715/757 |
| 2010/0175013 | A1 * | 7/2010 | Krauter | G06Q 10/10 715/771 |

(Continued)

FOREIGN PATENT DOCUMENTS

| | | |
|---|---|---|
| CN | 102831491 A | 12/2012 |
| JP | 2005062991 A | 3/2005 |

(Continued)

OTHER PUBLICATIONS

International Search Report and Written Opinion, dated Sep. 15, 2010, regarding Application No. PCT/US2008/075877, 9 pages.

(Continued)

*Primary Examiner* — Mariela Reyes
*Assistant Examiner* — Courtney Harmon
(74) *Attorney, Agent, or Firm* — Yee & Associates, P.C.

(57) ABSTRACT

A method and apparatus for delivering engineering data to a portable device for use in performing an operation. Engineering data for each part in a set of parts is stored in a file system on the portable device. A set of entries, each entry including a part identifier and a target locator for a part, is created for the set of parts to form a table. An initial locator constructed by a visualization tool is matched to a target locator in the table for a selected part. The target locator identifies a physical location in the file system of requested engineering data for the selected part. A local server on the (Continued)

portable device retrieves the requested engineering data based on the target locator. The local server serves the requested engineering data to a browser, which displays the requested engineering data for use in performing the operation on the selected part.

24 Claims, 8 Drawing Sheets

(56) References Cited

U.S. PATENT DOCUMENTS

| | | | | |
|---|---|---|---|---|
| 2010/0250461 | A1* | 9/2010 | Arnold | G06Q 10/08 705/333 |
| 2011/0166824 | A1* | 7/2011 | Haisty | G01B 5/12 702/157 |
| 2012/0304105 | A1 | 11/2012 | Lafever et al. | |
| 2012/0310602 | A1* | 12/2012 | Jacobi | G06F 17/5004 703/1 |
| 2013/0054176 | A1* | 2/2013 | Pedigo | B64F 5/0045 702/108 |
| 2013/0275272 | A1* | 10/2013 | Begin, Jr. | G06Q 30/0623 705/26.63 |
| 2014/0172727 | A1* | 6/2014 | Abhyanker | G06Q 30/0645 705/307 |
| 2014/0298227 | A1* | 10/2014 | Gass | G06F 3/0484 715/771 |
| 2014/0349637 | A1* | 11/2014 | Hyde | H01Q 3/00 455/419 |

FOREIGN PATENT DOCUMENTS

| | | |
|---|---|---|
| JP | 2006505047 A | 2/2006 |
| JP | 2012248188 A | 12/2012 |
| WO | WO2012166545 A2 | 12/2012 |

OTHER PUBLICATIONS

"Lifecycle Visualization Professional," Siemens Product Lifecycle Management Software, Inc., Siemens Industry Software, copyright 2011, 3 pages.
"Syncrofit," Siemens Product Lifecycle Management Software, Inc., Siemens Industry Software, copyright 2012, 16 pages, accessed Feb. 25, 2014. http://m.plm.automation.siemens.com/en_us/Images/Siemens-PLM-Specialized-Engineering-Software-Syncrofit-br_tcm1224-179692.pdf.
International Preliminary Report on Patentability and Written Opinion, dated Aug. 30, 2016, regarding Application No. PCT/US2015/013181, 7 pages.
European Patent Office Examination Report, dated Aug. 3, 2017, regarding Application No. 15704644.2, 7 pages.
Bidelman, "A Beginner's Guide to Using the Application Cache", html5rocks.com, dated Jun. 18, 2010, 9 pages. http://www.thml5rocks/en/tutorials/appcache/beginner.
Almaer et al., Using Google Base and Google Gears for a Performant, Offline Experience, Google, updated Aug. 13, 2012, 12 pages. https://developers.google.com/gdata/articles/gears_and_base_mashup.
Japanese Patent Office Notice of Reasons for Rejection with English Translation, dated Dec. 4, 2018, regarding Application No. JP2016-570767, 8 pages.
Chinese National Patent Office First Office Action with English Translation, dated Feb. 25, 2019, regarding Application No. 201580010346.2, 17 pages.
European Patent Office Communication Report, dated Apr. 16, 2018, regarding Application No. 15704644.2, 8 pages.
Chinese National Patent Office Second Office Action with English Translation, dated Jul. 22, 2019, regarding Application No. 201580010346.2, 15 pages.
Examining Division Oral Proceedings, dated Sep. 19, 2019, regarding Application No. 15704644.2, 19 pages.

* cited by examiner

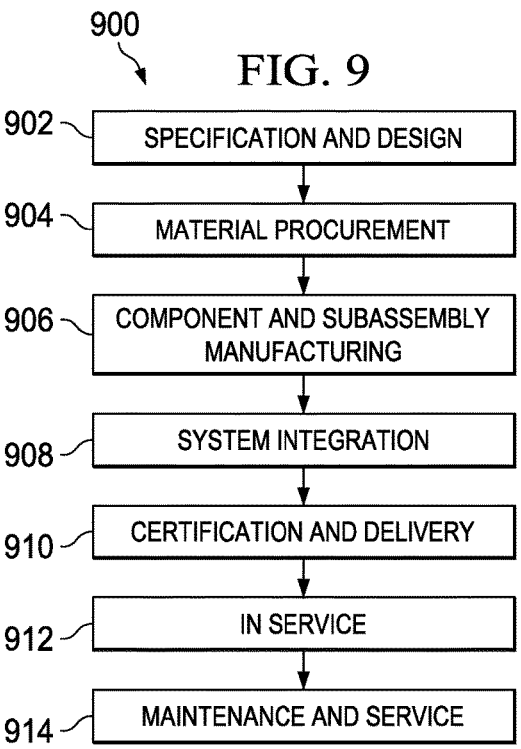
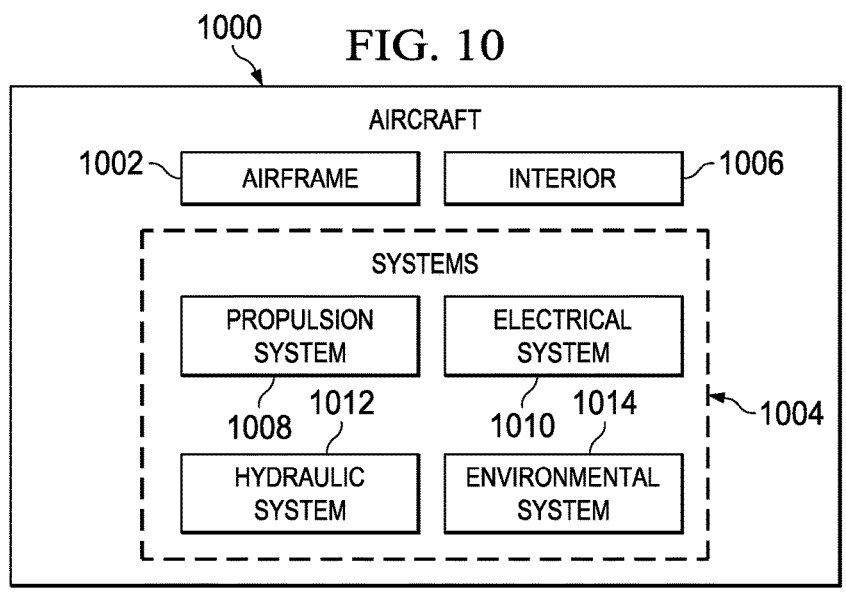

REMOTE DATA DELIVERY SYSTEM

BACKGROUND INFORMATION

1. Field

The present disclosure relates generally to engineering data and, in particular, to performing an operation on a part using engineering data for the part. Still more particularly, the present disclosure relates to a method and apparatus for delivering engineering data for a part from a network server system to a portable device for use in performing an operation on the part in a remote location.

2. Background

Oftentimes, engineering data is needed to perform a maintenance operation on one or more parts of a product. Engineering data for a part may include any data related to the design, manufacturing, or safety of the part. A maintenance operation may be, for example, a repair operation, a rework operation, a replacement operation, an inspection operation, or some other type of maintenance operation. The engineering data needed to perform a maintenance operation on a part may include, for example, without limitation, geometry data, product structure information, design information, manufacturing information, safety information, engineering notes, engineering drawings, or some combination thereof.

A product may be comprised of hundreds, thousands, tens of thousands, hundreds of thousands, or millions of parts, depending on the type of the product. With some currently available methods for retrieving engineering data for parts, identifying the engineering data needed to perform a maintenance operation on a particular part in a product may increase in difficulty as the number of parts that make up the product increases.

For example, in some cases, when an operator needs to perform a maintenance operation on an aircraft part, the operator brings hardcopies of the engineering data for the aircraft part to the field to perform the maintenance operation. These hardcopies may include, for example, without limitation, papers, blueprints, binders, photographs, other types of physical media, or some combination thereof. However, identifying the particular hardcopies needed for performing the maintenance operation on the aircraft part may be more difficult than desired when the aircraft part is one of a hundred thousand parts that make up an aircraft.

Further, shipping and storing all of the hardcopies of the engineering data needed for all of the parts that make up the aircraft may be more expensive and time-consuming than desired. Additionally, the hardcopies may not provide the level of detail needed to guide the operator or allow the operator to perform the maintenance operation with a desired level of accuracy.

For example, available photographs of an aircraft part may not include views of the portion of the aircraft part on which a maintenance operation is to be performed. As another example, an aircraft part may be located inside of an assembly of parts. In some cases, only photographs of the overall assembly may be available. These photographs may not provide the level of detail required to perform certain maintenance operations on the aircraft part.

Some currently available systems are configured to store engineering data for a product and the parts of the product on one or more servers connected to a network. These servers may be referred to as network servers and may form a network server system. The engineering data stored on the network server system may be accessed by any device able to and authorized to connect to the network. However, in some cases, a maintenance operation may need to be performed in a remote location. The remote location may be in an environment where coverage for establishing communications with the network is less than desirable. In some cases, access to the network may be unavailable from the remote location. In other cases, access to the network may not be authorized from the remote location. In these types of situations, an operator may be unable to retrieve the engineering data needed to perform a maintenance operation in a desired manner.

Inability to access the network or delays in accessing the network may result in time delays in retrieving the engineering data needed to perform the maintenance operation. These time delays may result in further time delays in performing the maintenance operation. Still further, these time delays may result in undesired increases in the cost of performing the maintenance operation. Therefore, it would be desirable to have a method and apparatus that take into account at least some of the issues discussed above, as well as other possible issues.

SUMMARY

In one illustrative embodiment, an apparatus comprises a data retriever, a table generator, a mapper, and a local server. The data retriever is configured to retrieve engineering data for each part in a set of parts identified by a visualization tool. The data retriever is further configured to store the engineering data in a file system on a portable device. The table generator is configured to create a set of entries for the set of parts to form a table in the file system. An entry in the set of entries includes a corresponding part identifier and a corresponding target locator for a part in the set of parts. A mapper is configured to match an initial locator constructed by the visualization tool to a target locator in the table for a selected part from the set of parts. The target locator identifies a physical location of requested engineering data for the selected part in the file system. The local server is located on the portable device. The local server is configured to retrieve the requested engineering data based on the physical location identified. The local server is further configured to serve the requested engineering data for the selected part to a browser. The requested engineering data is displayed in the browser for use in performing an operation on the selected part.

In another illustrative embodiment, a remote data delivery system comprises a data retriever, a table generator, a local server and a display device. The data retriever is configured to retrieve engineering data for each part in a set of parts identified by a visualization tool. The data retriever is further configured to store the engineering data in a file system on a portable device. The table generator is configured to create a set of entries for the set of parts to form a table in the file system. An entry in the set of entries includes a corresponding part identifier and a corresponding target locator for a part in the set of parts. The local server is located on the portable device. The local server is configured to receive an initial locator constructed by the visualization tool. The local server comprises a mapper configured to match the initial locator to a target locator in the table for a selected part from the set of parts. The target locator identifies a physical location of requested engineering data for the selected part in the file system. The local server is configured to retrieve the requested engineering data based on the physical location identified by the mapper. The local server is further configured to serve the requested engineering data for the selected part to a browser. The display device is associated with the portable device. The display device is configured to display the requested engineering data in the browser for use in performing a maintenance operation on the selected part.

In yet another illustrative embodiment, a method for remotely delivering requested engineering data to a portable device for use in performing an operation on a selected part is provided. Engineering data retrieved for each part in a set of parts is stored in a file system on the portable device. A set of entries is created for the set of parts to form a table in the file system. An entry in the set of entries includes a corresponding part identifier and a corresponding target locator for a part in the set of parts. An initial locator constructed by a visualization tool is matched to a target locator in the table for the selected part. The target locator identifies a physical location of the requested engineering data for the selected part in the file system. The requested engineering data is retrieved by a local server located on the portable device based on the physical location identified. The requested engineering data for the selected part is served by the local server to a browser. The requested engineering data is displayed in the browser for use in performing the operation on the selected part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of an aircraft manufacturing and service method in the form of a block diagram in accordance with an illustrative embodiment; and FIG. 10 is an illustration of an aircraft is depicted in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a system capable of providing engineering data stored on a network server system to an operator performing a maintenance operation in a remote location. Thus, the illustrative embodiments provide a method and apparatus for delivering engineering data stored on a network server system to a portable device for use in performing an operation on a part in a remote location where accessing the network server system is more difficult than desired.

Figure 1:
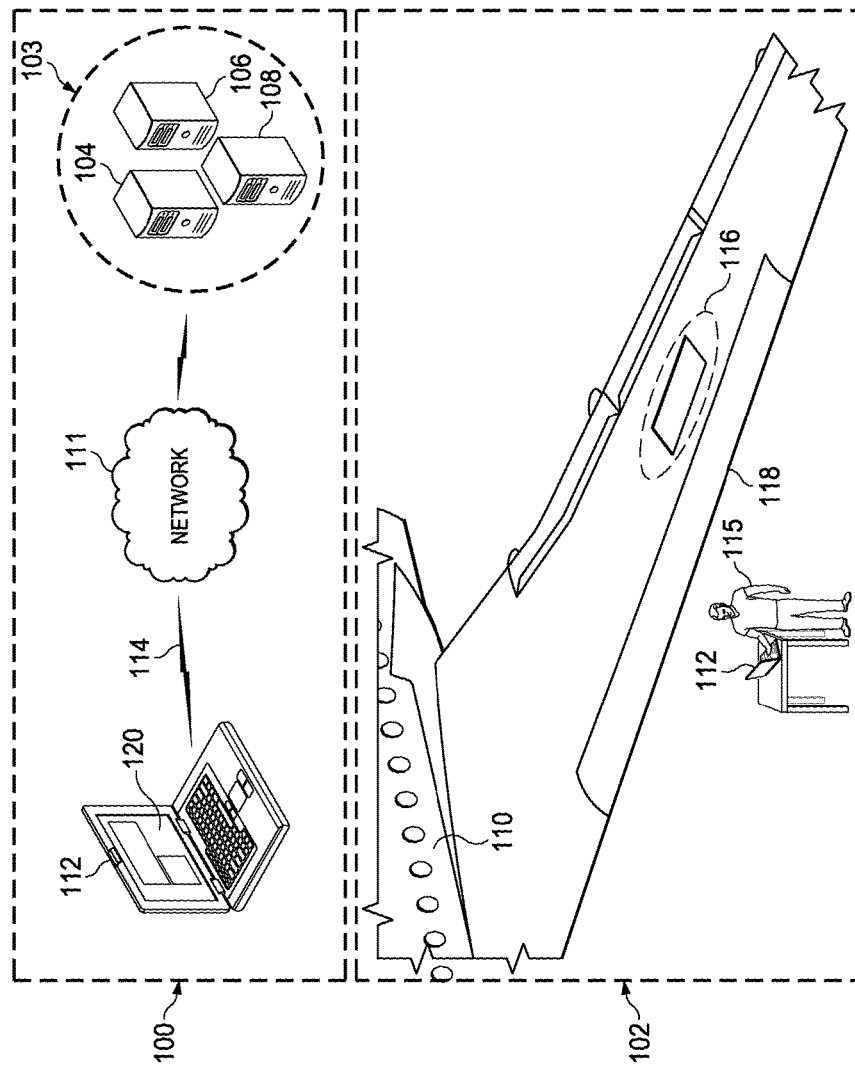
FIG. 1 is an illustration of a network environment and a maintenance environment in accordance with an illustrative embodiment.

Referring now to the figures and, in particular, with reference to FIG. 1, an illustration of a network environment and a maintenance environment is depicted in accordance with an illustrative embodiment. In this illustrative example, network environment 100 is an example of an environment in which data may be stored. Maintenance environment 102 is an example of an environment in which any number of maintenance operations may be performed. Maintenance environment 102 is located remotely from network environment 100.

As depicted, network environment 100 includes network server system 103. Network server system 103 includes network servers 104, 106, and 108. These network servers are configured to store data about aircraft 110. This data may include engineering data about aircraft 110 and the parts that make up aircraft 110, as well as other types of data about aircraft 110.

In this illustrative example, network servers 104, 106, and 108 are connected to network 111. One or more different types of communications links may be used to connect network servers 104, 106, and 108 to network 111. These communications links may include any number of wired communications links, wireless communications links, optical communications links, other types of communications links, or some combination thereof.

Other devices may connect to network 111 to access the data stored on network servers 104, 106, and 108. As one illustrative example, laptop 112 may be configured to connect to network 111, and thereby, access network server system 103, through wireless communications link 114.

In this illustrative example, operator 115 has the task of performing a maintenance operation on portion 116 of wing 118 of aircraft 110. The engineering data needed to perform this maintenance operation is stored on network server system 103.

The illustrative embodiments recognize and take into account that it may be desirable for operator 115 to be able to access engineering data for portion 116 of wing 118 of aircraft 110 independently of network 111 when operator 115 is present within maintenance environment 102. The illustrative embodiments also recognize and take into account that copying all of the engineering data for aircraft 110 stored on network server system 103 onto laptop 112 such that the engineering data may be transported to maintenance environment 102 may not always be desirable or even feasible.

For example, laptop 112 may not have the storage capacity to hold all of the engineering data for aircraft 110. If laptop 112 is able to hold all of the engineering data, running programs on laptop 112 that are configured to retrieve portions of the engineering data and display these portions to operator 115 may be slowed down more than desired.

Thus, the illustrative embodiments recognize and take into account that it may be desirable to have a system capable of downloading onto laptop 112 only the portion of engineering data needed to perform the maintenance operation on portion 116 of wing 118. Further, the illustrative embodiments recognize and take into account that it may be desirable to have a system capable of allowing existing programs running on laptop 112 to use the downloaded engineering data without alternating these existing programs more than desired and without changing the experience of operator 115 using these existing programs on laptop 112 more than desired.

For example, a visualization tool may be implemented on laptop 112. When laptop 112 is connected to network 111, this visualization tool may be used to retrieve and cache visualization data for portion 116 of wing 118 from network server system 103. The visualization tool may be configured to use the cached visualization data to visually present the three-dimensional geometry of portion 116 of wing 118 to operator 115 on screen 120 of laptop 112 when operator 115 is in maintenance environment 102.

The visualization tool may allow operator 115 to access the engineering data on network server system 103 when laptop 112 is connected to network 111. However, when laptop 112 is connected to network 111, the existing functions of the visualization tool may not allow the engineering data for portion 116 of wing 118 to be stored for remote use.

The different illustrative embodiments recognize and take into account that it may be desirable to have a system that works with the visualization tool to retrieve engineering data for portion 116 of wing 118 in a manner such that the visualization tool can access and visually present the engineering data to operator 115 when operator 115 is in maintenance environment 102. The different illustrative embodiments recognize and take into account that it may be undesirable to use a cache to hold the engineering data because the size of the cache needed may vary as the portion of the aircraft of interest varies. Thus, using a fixed cache may not be desirable. Further, in some cases, the size of the cache needed to hold the engineering data may be larger than desired.

With respect to the above example, the illustrative embodiments recognize and take into account that it may be desirable to have a system capable of providing access to the engineering data for portion 116 of wing 118 through laptop 112 when operator 115 is in maintenance environment 102 that does alter the visualization tool more than desired. Further, the illustrative embodiments recognize and take into account that it may be desirable to perform this type of "remote data delivery" without changing the manner in which operator 115 typically uses the visualization tool to access engineering data.

Thus, the illustrative embodiments provide a remote data delivery system that may be implemented on laptop 112 and used to deliver requested engineering data from network environment 100 to maintenance environment 102. An example of one manner in which this remote data delivery system may be implemented is described in greater detail in FIGS. 2-3 below.

In this illustrative example, operator 115 may use the remote data delivery system implemented on laptop 112 to copy engineering data corresponding to portion 116 of wing 118 from network server system 103. The engineering data copied by the remote data delivery system is stored locally in a file system on laptop 112.

As depicted, operator 115 then takes laptop 112 to maintenance environment 102 to perform a maintenance operation of one or more parts in portion 116 of wing 118. For example, operator 115 may use the visualization tool implemented on laptop 112 to request engineering data for a particular part. In particular, operator 115 may request engineering data that is required or needed for performing the maintenance operation. In other words, operator 115 may use the visualization tool implemented on laptop 112 to request required engineering data, which may also be referred to as needed engineering data. The remote data delivery system works with the visualization tool to retrieve the requested engineering data from the file system on laptop 112 and visually present the requested engineering data to operator 115 on screen 120 of laptop 112.

The remote data delivery system provided by the illustrative embodiments allows operator 115 to access the requested engineering data in the same manner as if laptop 112 were connected to network 111. The remote data delivery system is configured such that the experience of operator 115 is not changed although the location from which the visualization tool retrieves the requested engineering data is changed.

Figure 2:
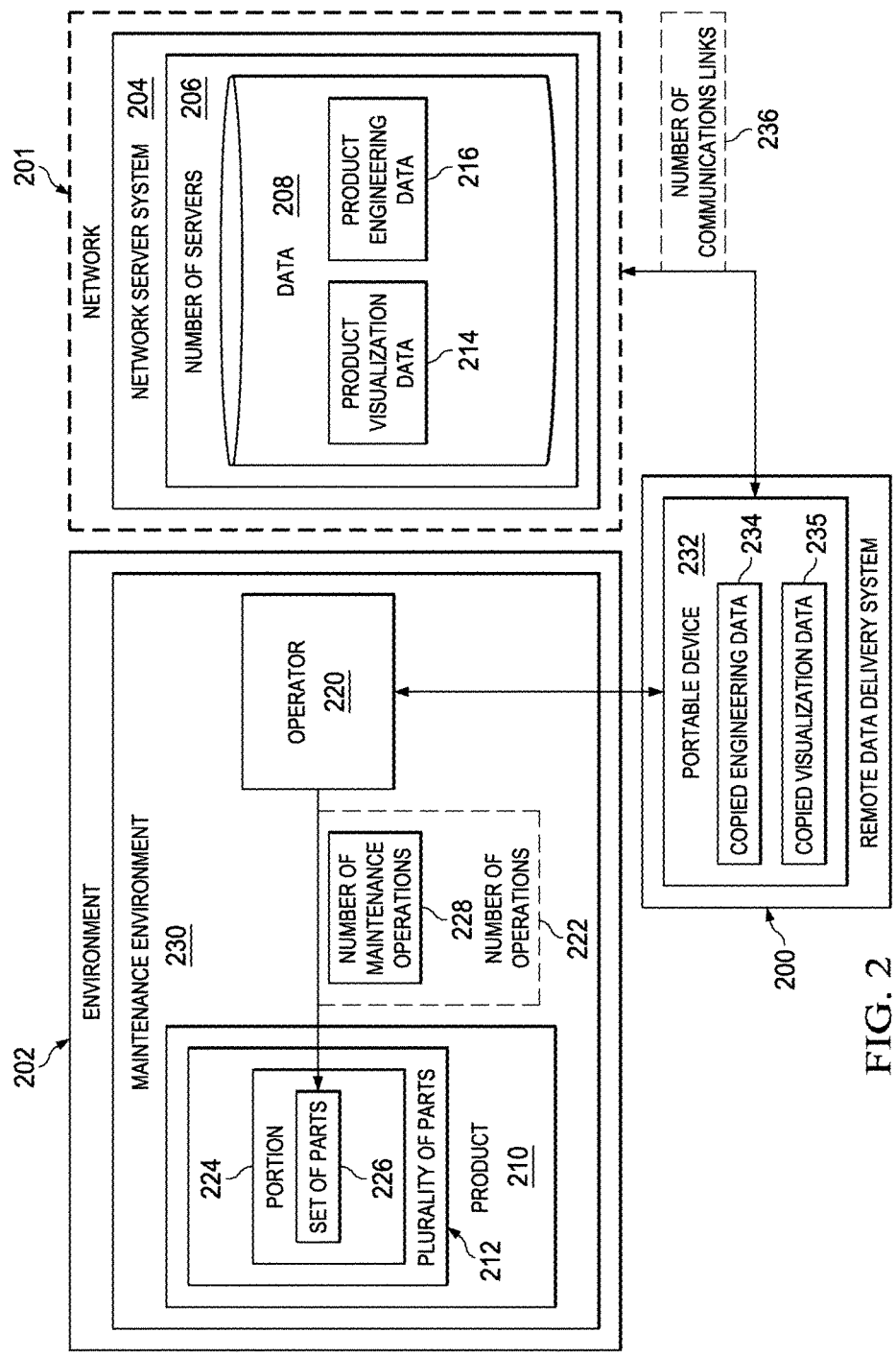
FIG. 2 is an illustration of a remote data delivery system in the form of a block diagram in accordance with an illustrative embodiment.

With reference now to FIG. 2, an illustration of a remote data delivery system is depicted in the form of a block diagram in accordance with an illustrative embodiment. In this illustrative example, remote data delivery system 200 may be used to access and retrieve data through network 201 for remote delivery to environment 202.

Network 201 is a communications network that allows hardware devices to exchange data over communications links. These communications links may include wired communications links, wireless communications links, optical communications links, or some combination thereof. The devices connected to network 201 by these communications links may include computers, servers, networking hardware, and other types of devices. Network 111 in FIG. 1 is an example of one implementation for network 201.

In this illustrative example, network 201 includes network server system 204. Network server system 204 may include number of servers 206. As used herein, a "number of" items may include one or more items. In this manner, number of servers 206 may include one or more servers. Network server system 103 in FIG. 1 is an example of one implementation for network server system 204. Network servers 104, 106, and 108 in FIG. 1 may be an example of one implementation for number of servers 206.

Number of servers 206 is used to store data 208 about product 210. Product 210 may be comprised of plurality of parts 212. A part in plurality of parts 212 may be a single part, a sub-assembly of parts, an assembly of parts, or an assembly comprised of parts, sub-assemblies, assemblies, or a combination thereof, depending on the implementation. In some cases, a part in plurality of parts 212 may also be considered a type of product.

Product 210 may be any object, structure, or device configured to be manufactured using plurality of parts 212. Product 210 may take a number of different forms. For example, product 210 may take the form of an aircraft, an unmanned aerial vehicle, a spacecraft, a satellite, a ship, a submarine, a ground vehicle, a wing of an aircraft, a building, a machine, a robotic vehicle, a valve system, a fuel system, or some other type of product. Aircraft 110 in FIG. 1 is an example of one implementation for product 210.

Data 208 about product 210 may include drawings, notes, lists, spreadsheets, documents, computer models, computer-aided design (CAD) models, manuals, information stored in databases, other types of information, or some combination thereof. In this illustrative example, data 208 about product 210 includes product visualization data 214 and product engineering data 216. In other illustrative examples, data 208 may also include other types of data about product 210.

Product visualization data 214 includes all data needed to generate a visualization of product 210 or any portion of product 210. For example, product visualization data 214 may include, but is not limited to, two-dimensional geometry data, three-dimensional geometry data, product structure data, metadata, and other types of data. As used herein, a "visualization" of an item, such as product 210, a portion of product 210, or a part in plurality of parts 212 may be a display of a two-dimensional or three-dimensional model of the item. In some cases, the visualization may be an interactive display configured to allow a user to manipulate the view of the two-dimensional or three-dimensional model of the item.

Product engineering data 216 may include all data related to the design, manufacturing, maintenance, and safety of product 210. For example, product engineering data 216 may include engineering data for each part in plurality of parts 212 that make up product 210. The engineering data for a part may include, for example, without limitation, at least one of design information, manufacturing and maintenance information, safety information, engineering notes, or some combination thereof.

The design information may include, for example, but is not limited to, at least one of tolerance information, part dimensions information, three-dimensional models of the part, two-dimensional models of the part, a material profile of the part, a chemical profile of the part, and other types of design data. The manufacturing and maintenance information may include, for example, but is not limited to, at least one of assembly and disassembly requirements information, manufacturing and maintenance process information, manufacturing and maintenance tools information, and other types of data related to the manufacturing, maintenance, or both, of product 210. The safety information may include information about safety protocols to be used during the manufacturing or maintenance of the part, as well as other types of safety protocols.

Environment 202 may be remotely located from network server system 204. Connectivity to network 201 may be less than desirable from within environment 202. In other words, accessing network 201 from environment 202 may be more difficult than desired due to an inability to establish a communications link of a desired quality with network 201, lack of authorization to access network 201, or some other reason.

In this illustrative example, operator 220 has the task of performing number of operations 222 on portion 224 of product 210 within environment 202. Portion 224 of product 210 may include set of parts 226. As used herein, a "set of" items may include one or more items. Portion 116 of wing 118 of aircraft 110 in FIG. 1 is an example of one implementation for portion 224 of product 210.

Number of operations 222 may include different types of operations such as, for example, without limitation, manufacturing operations, maintenance operations, and other types of operations. In one illustrative example, number of operations 222 may be number of maintenance operations 228. In this manner, environment 202 may be referred to as maintenance environment 230. Maintenance environment 102 in FIG. 1 may be an example of one implementation for maintenance environment 230. A maintenance operation in number of maintenance operations 228 may take the form of a repair operation, a rework operation, a replacement operation, a service operation, a testing operation, an inspection operation, some other type of maintenance operation, or some combination thereof.

Operator 220 may require access to the portion of product engineering data 216 corresponding to portion 224 of product 210 when operator 220 is in environment 202 to perform number of operations 222. Remote data delivery system 200 is configured to deliver this portion of product engineering data 216 from network server system 204 to portable device 232, which may be transported to environment 202 for use in performing number of operations 222.

Remote data delivery system 200 is configured to connect to network 201 to access product engineering data 216 stored on number of servers 206. Remote data delivery system 200 is further configured to copy the desired portion of product engineering data 216 for performing number of operations 222 onto portable device 232 to form copied engineering data 234. Portable device 232 may take a number of different forms. Depending on the implementation, portable device 232 may be selected from one of a laptop, a smartphone, a personal digital assistant, a tablet, a portable computer, an external storage device, or some other type of portable device capable of storing a sufficiently large amount of data.

In one illustrative example, portable device 232 may receive copied engineering data 234 through network 201 over number of communications links 236. A communications link in number of communications links 236 may be selected from one of a wired link, a wireless link, an optical link, or some other type of communications link.

Further, in some illustrative examples, remote data delivery system 200 may also be used to copy a portion of product visualization data 214 to form copied visualization data 235. Copied visualization data 235 may include data needed for visualizing set of parts 226 during the performance of number of operations 222.

Remote data delivery system 200 stores copied engineering data 234 in a manner that allows copied engineering data 234 to be easily accessible within environment 202 independent of network 201. Remote data delivery system 200 is described in greater detail in FIG. 3 below.

Figure 3:
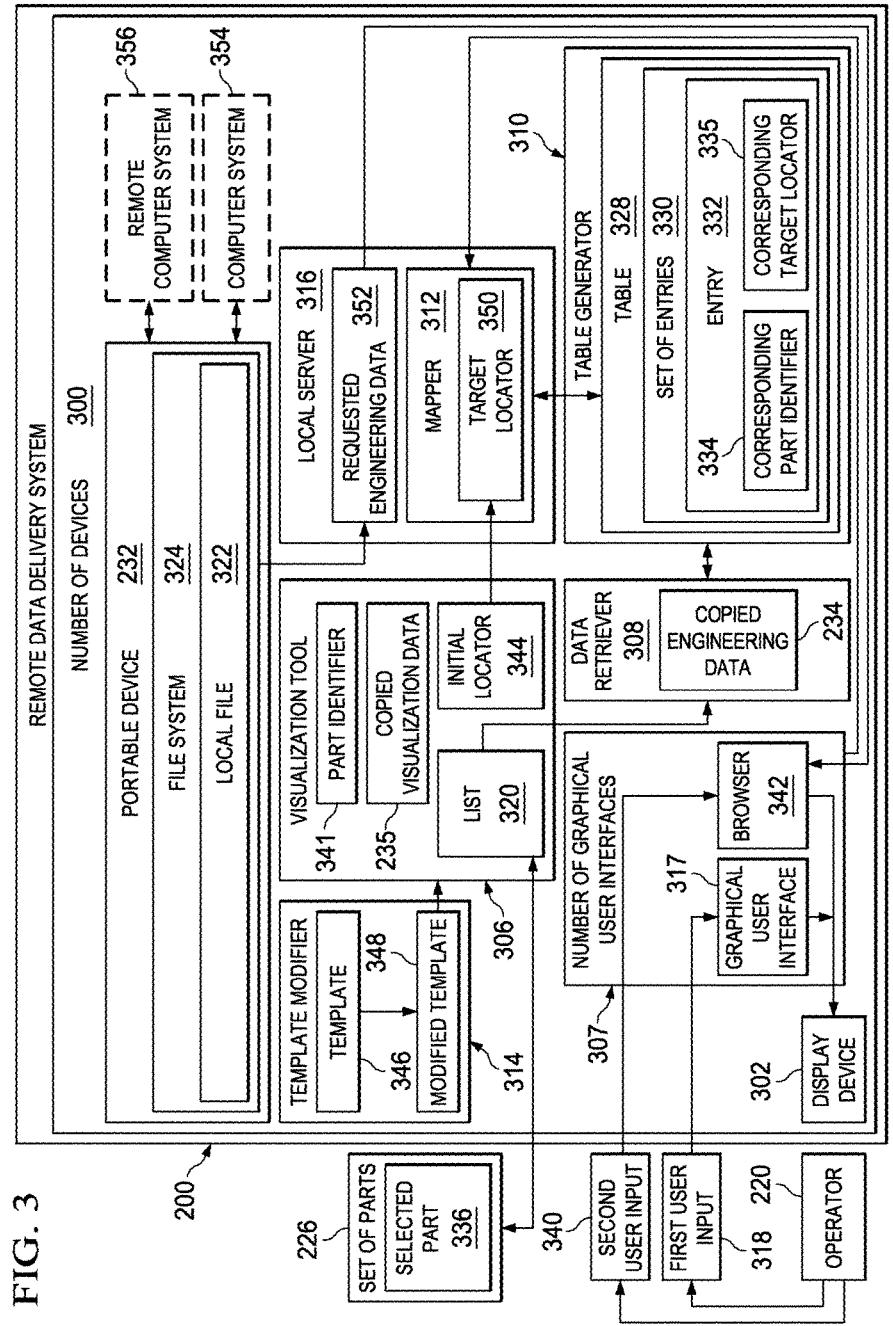
FIG. 3 is an illustration of a remote data delivery system in the form of a block diagram in accordance with an illustrative embodiment.

With reference now to FIG. 3, an illustration of remote data delivery system 200 from FIG. 2 is depicted in the form of a block diagram in accordance with an illustrative embodiment. In this illustrative example, remote data delivery system 200 may be implemented using number of devices 300.

In one illustrative example, number of devices 300 includes portable device 232 and display device 302. Of course, in other illustrative examples, number of devices 300 may include other types of devices in addition to or in place of portable device 232, display device 302, or both.

Display device 302 may be part of portable device 232 or separate from portable device 232, depending on the implementation. For example, when portable device 232 takes the form of a laptop, display device 302 may be the screen that is part of the laptop. Of course, in other cases, display device 302 may be an external monitor connected to the laptop. Laptop 112 in FIG. 1 is an example of one implementation for portable device 232. Screen 120 in FIG. 1 is an example of one implementation for display device 302.

As depicted, remote data delivery system 200 includes visualization tool 306, number of graphical user interfaces 307, data retriever 308, table generator 310, mapper 312, template modifier 314, and local server 316. Each of visualization tool 306, number of graphical user interfaces 307, data retriever 308, table generator 310, mapper 312, template modifier 314, and local server 316 may be implemented using software, hardware, or a combination of the two, depending on the implementation.

In one illustrative example, portable device 232 may take the form of some type of data processing unit. The portable data processing unit may be, for example, without limitation, a laptop, a tablet, or some other type of data processing unit capable of being easily moved between different locations. Each of visualization tool 306, number of graphical user interfaces 307, data retriever 308, table generator 310, mapper 312, template modifier 314, and local server 316 may be implemented as hardware, software, or a combination of the two in this portable data processing unit.

In this illustrative example, visualization tool 306 may take the form of an integration visualization tool (IVT). Visualization tool 306 may be configured to visually present a visualization of product 210 or a portion of product 210 in FIG. 2 to operator 220 using at least one of number of graphical user interfaces 307.

For example, operator 220 may establish a communications link between portable device 232 and network 201 in FIG. 2 and initialize visualization tool 306. Visualization tool 306 may visually present, on display device 302, an interactive three-dimensional visualization of a three-dimensional model of product 210 using graphical user interface 317 of number of graphical user interfaces 307.

Operator 220 may enter first user input 318 through graphical user interface 317 to identify portion 224 of product 210 in FIG. 2 that is of interest. Visualization tool 306 receives first user input 318. First user input 318 may include, for example, without limitation, a selection of a portion of a three-dimensional visualization of product 210 corresponding to portion 224, a selection of a volume of the three-dimensional visualization of product 210 corresponding to portion 224, a number of parameters defining portion 224, or some other type of user input identifying portion 224.

In this illustrative example, visualization tool 306 uses first user input 318 to generate list 320 identifying set of parts 226 in portion 224 of product 210. Visualization tool 306 stores list 320 in local file 322 in file system 324 on portable device 232. Further, visualization tool 306 uses first user input 318 to access product visualization data 214 stored on network server system 204 in FIG. 2. Visualization tool 306 copies the portion of product visualization data 214 corresponding to set of parts 226 to form copied visualization data 235.

Data retriever 308 is configured to receive list 320 in response to the occurrence of a selected event. The selected event may be, for example, without limitation, the receiving of user input through graphical user interface 317 or another one of number of graphical user interfaces 307, the generation of list 320 by visualization tool 306, a lapse of a period of time after the generation of list 320, the storage of list 320 in local file 322 in file system 324 on portable device 232, or some other type of event. In this manner, the selected event may be automatic or user-generated, depending on the implementation.

Data retriever 308 is configured to retrieve engineering data for each part in set of parts 226 identified in list 320 to form copied engineering data 234. Data retriever 308 stores copied engineering data 234 in file system 324. The engineering data for each part in set of parts 226 may be stored in a different physical location in file system 324 relative to the engineering data for the other parts in set of parts 226.

Table generator 310 is configured to communicate with data retriever 308 to create table 328. Table generator 310 may create set of entries 330 for set of parts 226 to form table 328. Table 328 is stored in file system 324. Each entry in set of entries 330 is associated with a part in set of parts 226 with the physical location in file system 324 at which the engineering data for that part is stored.

Entry 332 may be an example of an entry in set of entries 330. Entry 332 may include corresponding part identifier 334 and corresponding target locator 335 for a part in set of parts 226.

Corresponding part identifier 334 may include a part number, a revision number, an instantiation identifier for the part, some other type of identification information for the part, or a combination thereof. The part number may identify the type of part. The revision number may identify the particular revision level of that part. The instantiation identifier may identify the particular instantiation of the part within product 210. The instantiation identifier may identify, for example, a location of the part within product 210.

Corresponding target locator 335 may identify the physical location of the engineering data for the part identified by corresponding part identifier 334 within file system 324. In this illustrative example, corresponding target locator 335 may take the form of, for example, a uniform resource locator (URL).

After local file 322 has been stored in file system 324, copied engineering data 234 has been stored in file system 324, and table 328 has been generated, the data replication portion of the process of remotely delivering engineering data from network server system 204 to environment 202 may be completed. Portable device 232 may then be moved to environment 202 in FIG. 2 to perform number of operations 222.

In environment 202, operator 220 may again initialize visualization tool 306. Visualization tool 306 uses copied visualization data 235 to visually present the three-dimensional visualization of portion 224 of product 210 to operator 220.

Operator 220 may then enter second user input 340. Second user input 340 may include, for example, without limitation, a selection of selected part 336 in set of parts 226 in portion 224 of product 210 and a request for engineering data for selected part 336. In this manner, second user input 340 may include more than one selection or actual inputs. Visualization tool 306 may identify part identifier 341 based on the identification of selected part 336 by second user input 340.

Visualization tool 306 constructs initial locator 344 using part identifier 341 and modified template 348 formed by template modifier 314. Initial locator 344 may be a uniform resource locator (URL). Template modifier 314 forms modified template 348 by modifying template 346 typically used by visualization tool 306. Template 346 may be a first portion of a uniform resource locator that identifies one of the network servers in network server system 204 in FIG. 2. The second portion of the uniform resource locator may be filled in using part identifier 341.

Template modifier 314 changes the first portion of template 346 such that this portion identifies local server 316 instead of one of the network servers in network server system 204 in FIG. 2. Thus, when using modified template 348, visualization tool 306 constructs initial locator 344 instead of the standard locator that is typically constructed using template 346.

Template 346 may be modified by template modifier 314 in response to a selected event. This selected event may be, for example, without limitation, the selection of a graphical control through one of number of graphical user interfaces 307 by the user, user input of some other kind, the initialization of visualization tool 306 without a communications link to network 201, or some other type of event. In this manner, the event may be an automatic event or a user-generated event, depending on the implementation.

Visualization tool 306 opens browser 342 using initial locator 344 such that browser 342 may access the resource identified by initial locator 344, which is local server 316. Local server 316 may service initial locator 344. Browser 342 is another example of one of number of graphical user interfaces 307. Browser 342 may be displayed to operator 220 on display device 302.

Browser 342 sends initial locator 344 to local server 316 for servicing. Mapper 312 is located within local server 316 and configured to receive initial locator 344.

Mapper 312 may match initial locator 344 to target locator 350 in table 328 for selected part 336. In other words, mapper 312 may associate initial locator 344 with target locator 350 in table 328. In particular, mapper 312 may extract part identifier 341 for selected part 336 from initial locator 344, match part identifier 341 to a corresponding part identifier in a particular entry in table 328, and identify the corresponding target locator in the particular entry as target locator 350 for selected part 336.

Thus, the association of initial locator 344 to target locator 350 allows an identification of target locator 350 based on knowing initial locator 344. Target locator 350 identifies a physical location of requested engineering data 352 for selected part 336 in file system 324. In this manner, all of requested engineering data 352 for selected part 336 may be retrieved based solely on the corresponding part identifier for selected part 336 and target locator 350 identifying the physical location of requested engineering data 352 in file system 324.

Local server 316 uses target locator 350 to retrieve requested engineering data 352 from the physical location in file system 324 identified by target locator 350. Local server 316 serves requested engineering data 352 for selected part 336 to browser 342. Browser 342 is configured to display requested engineering data 352 on display device 302 for use by operator 220 in performing at least one operation in number of operations 222 on selected part 336. In this illustrative example, requested engineering data 352 may be required engineering data, or needed engineering data. The required engineering data may be engineering data that is needed for performing at least one of number of operations 222 on selected part 336.

The illustration of remote data delivery system 200 in FIGS. 2-3 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, although visualization tool 306 is described as part of remote data delivery system 200 in FIGS. 2-3, visualization tool 306 may be considered separate or independent from remote data delivery system 200 in other illustrative examples. In these other examples, remote data delivery system 200 may be configured to communicate with and work with visualization tool 306.

In some illustrative examples, portable device 232 may be an external storage device. File system 324 may be located on the external storage device. In these examples, at least visualization tool 306, number of graphical user interfaces 307, data retriever 308, and table generator 310 may be implemented on computer system 354 located where access to network 201 is both readily available and authorized. Further, at least visualization tool 306, number of graphical user interfaces 307, mapper 312, template modifier 314, and local server 316 may be implemented on remote computer system 356 located in maintenance environment 202 from FIG. 2.

The external storage device may be configured to connect to computer system 354 such that copied engineering data 234 may be stored on the external storage device. The external storage device may then be moved and connected to remote computer system 356 to allow access to the data stored on file system 324 on the external storage device.

In other illustrative examples, visualization tool 306 may not be implemented on remote computer system 356. Only mapper 312, template modifier 314, and local server 316 may be implemented on remote computer system 356 in some cases. In other cases, any device or program capable of using table 328 to retrieve data from file system 324 based on a part identifier may be implemented on remote computer system 356.

By transporting only copied engineering data 234 for set of parts 226 and not all of the engineering for product 210 to environment 202, remote data delivery system 200 may be used to narrowly restrict access to product engineering data 216. Further, in some illustrative examples, smaller subsets of data may be stored on file system 324 using remote data delivery system 200. For example, without limitation, data retriever 308 may be configured to only retrieve a portion of the engineering data for a particular part instead of all of the engineering data for the particular part to restrict the level of access to the engineering data for the part.

In some illustrative examples, at least one of file system 324 or portable device 232 may be encrypted. This encryption may be used to ensure that any data stored in file system 324 is only accessible by authorized personnel.

Depending on the implementation, each of visualization tool 306, number of graphical user interfaces 307, data retriever 308, table generator 310, mapper 312, template modifier 314, and local server 316 may be implemented in software, hardware, firmware, or a combination thereof. When software is used, the operations performed by one or more of visualization tool 306, number of graphical user interfaces 307, data retriever 308, table generator 310, mapper 312, template modifier 314, and local server 316 may be implemented by using, for example, without limitation, program code configured to run on a processor unit. When firmware is used, the operations performed by one or more of visualization tool 306, number of graphical user interfaces 307, data retriever 308, table generator 310, mapper 312, template modifier 314, and local server 316 may be implemented using, for example, without limitation, program code and data and stored in persistent memory to run on a processor unit.

When hardware is employed, the hardware may include one or more circuits that operate to perform the operations performed by one or more of visualization tool 306, number of graphical user interfaces 307, data retriever 308, table generator 310, mapper 312, template modifier 314, and local server 316. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by each of visualization tool 306, number of graphical user interfaces 307, data retriever 308, table generator 310, mapper 312, template modifier 314, and local server 316 may be performed using organic components integrated with inorganic components. In some cases, the operations and processes may be performed by entirely organic components, excluding a human being. As one illustrative example, circuits in organic semiconductors may be used to perform these operations and processes.

Visualization tool 306, number of graphical user interfaces 307, data retriever 308, table generator 310, mapper 312, template modifier 314, and local server 316 are shown in FIG. 3 as functional blocks that are separate from each other. However, the software, hardware, firmware, or combination thereof used for implementing these components may result in combining one or more of these blocks or dividing one or more of these blocks. For example, in some cases, number of graphical user interfaces 307 may be considered part of visualization tool 306. In another example, mapper 312 may be considered separate from local server 316 and may be located on a different local server located on portable device 232 configured to communicate with local server 316.

Figure 4:
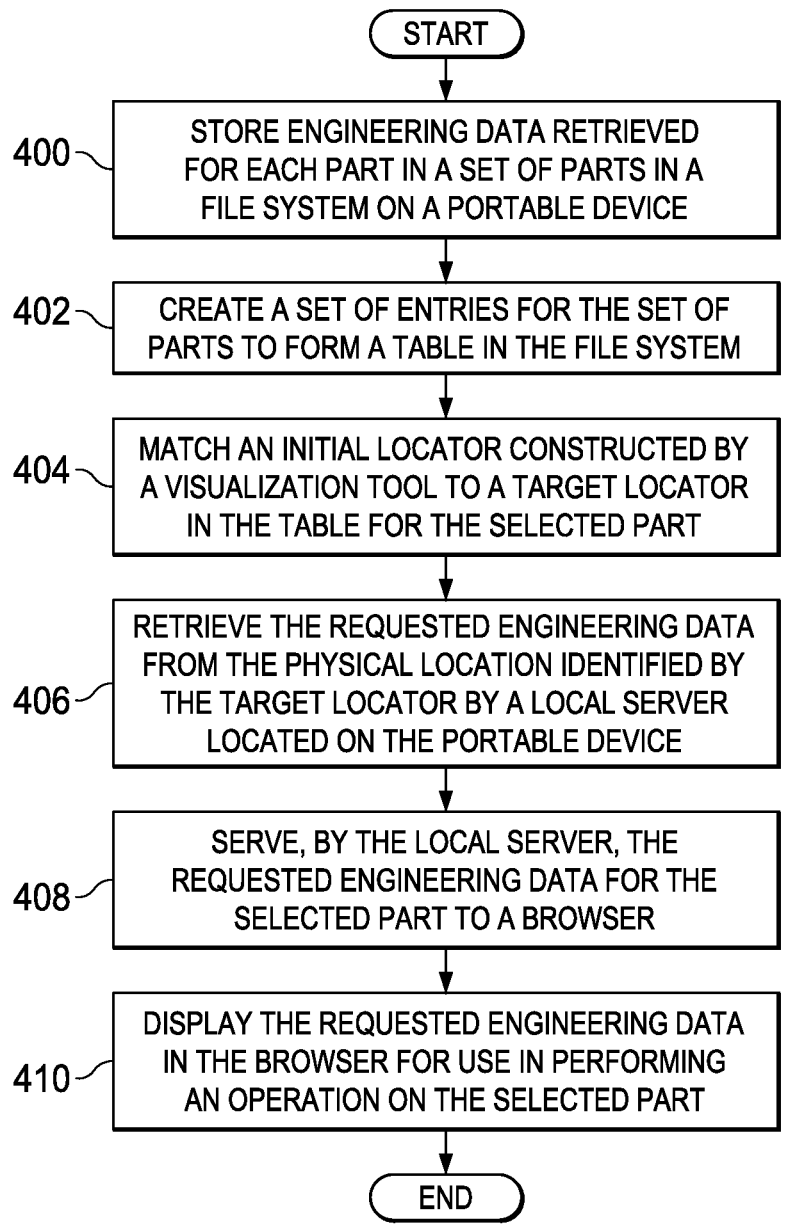
FIG. 4 is an illustration of a process for delivering requested engineering data stored on a network server to a portable device in the form of a flowchart in accordance with an illustrative embodiment.

With reference now to FIG. 4, an illustration of a process for delivering requested engineering data stored on a network server to a portable device is depicted in the form of a flowchart in accordance with an illustrative embodiment. The process illustrated in FIG. 4 may be implemented using remote data delivery system 200 depicted in FIGS. 2-3.

The process begins by storing engineering data retrieved for each part in a set of parts in a file system on a portable device (operation 400). Then, a set of entries is created for the set of parts to form a table in the file system (operation 402). An entry in the set of entries includes a corresponding part identifier and a corresponding target locator for a part in the set of parts.

Thereafter, an initial locator constructed by a visualization tool is matched to a target locator in the table for the selected part (operation 404). The target locator identifies a physical location of the requested engineering data for the selected part in the file system. The requested engineering data may be required engineering data, or needed engineering data. The required engineering data may be engineering data that is needed for performing at least one operation on the selected part.

Next, the requested engineering data is retrieved from the physical location identified by the target locator by a local server located on the portable device (operation 406). The requested engineering data for the selected part is then served, by the local server, to a browser (operation 408). The requested engineering data is displayed in the browser for use in performing an operation on the selected part (operation 410), with the process terminating thereafter.

Figure 5:
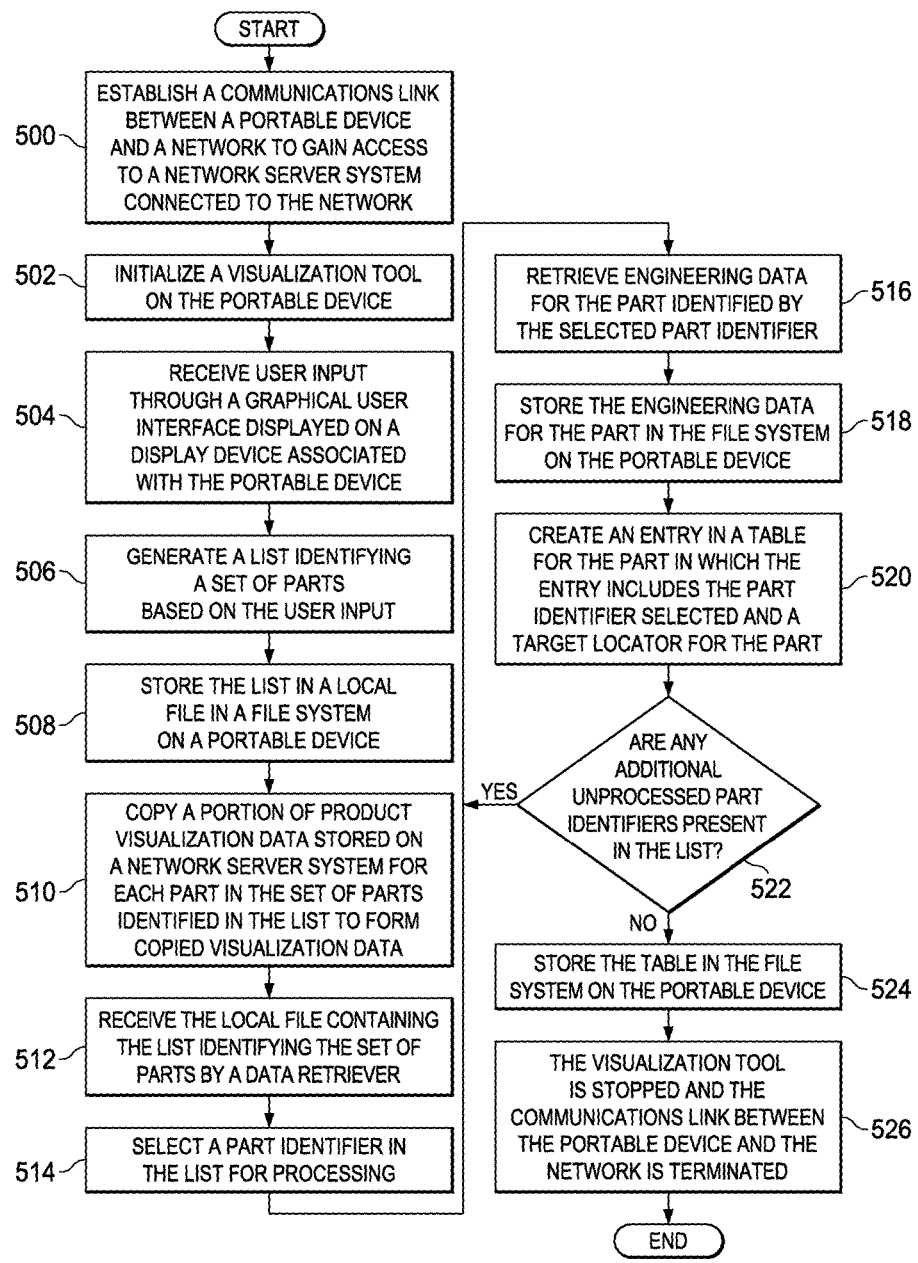
FIG. 5 is an illustration of a process for delivering requested engineering data stored on a network server to a portable device in the form of a flowchart in accordance with an illustrative embodiment.

With reference now to FIG. 5, an illustration of a process for delivering requested engineering data stored on a network server to a portable device is depicted in the form of a flowchart in accordance with an illustrative embodiment. The process illustrated in FIG. 5 may be implemented using remote data delivery system 200 depicted in FIGS. 2-3. In one illustrative example, this process may be performed within a data management environment.

The process may begin by establishing a communications link between a portable device and a network to gain access to a network server system connected to the network (operation 500). Then, a visualization tool is initialized on the portable device (operation 502). The visualization tool then receives user input through a graphical user interface displayed on a display device associated with the portable device (operation 504). Next, the visualization tool generates a list identifying a set of parts based on the user input (operation 506). In operation 506, the list may include the part identifier for each part in the set of parts.

The visualization tool stores the list in a local file in a file system on a portable device (operation 508). Further, the visualization tool copies a portion of product visualization data stored on a network server system for each part in the set of parts identified in the list to form copied visualization data (operation 510).

Thereafter, the local file containing the list identifying the set of parts is received by a data retriever (operation 512). The data retriever selects a part identifier in the list for processing (operation 514). The data retriever retrieves engineering data for the part identified by the selected part identifier (operation 516). The data retriever stores the engineering data for the part in the file system on the portable device (operation 518).

Thereafter, an entry is created in a table for the part in which the entry includes the part identifier selected and a target locator for the part (operation 520). In operation 520, the target locator identifies the physical location of the engineering data for the part in the file system. In this manner, the entry associates the physical location in the file system of the engineering data for a particular part to the part identifier for that particular part. In particular, all of the engineering data for that part may be retrieved by simply using the part identifier for the part and the entry in the table identifying the physical location of the engineering data in the file system.

The data retriever then determines whether any additional unprocessed part identifiers are present in the list (operation 522). If any additional unprocessed part identifiers are present in the list, the process returns to operation 514 as described above. Otherwise, if no additional unprocessed part identifiers are present in the list, the data retriever stores the table in the file system on the portable device (operation 524). The visualization tool is stopped and the communications link between the portable device and the network is terminated (operation 526), with the process terminating thereafter.

Figure 6:
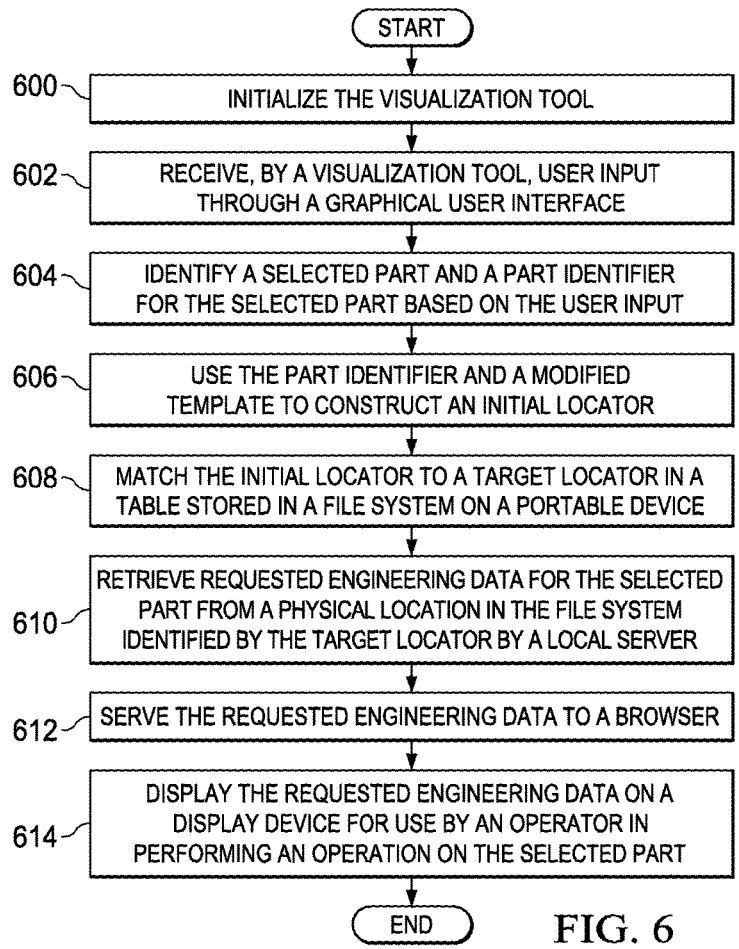
FIG. 6 is an illustration of a process for visually presenting requested engineering data stored on a portable device to an operator in the form of a flowchart in accordance with an illustrative embodiment.

With reference now to FIG. 6, an illustration of a process for visually presenting requested engineering data stored on a portable device to an operator is depicted in the form of a flowchart in accordance with an illustrative embodiment. The process illustrated in FIG. 6 may be implemented using remote data delivery system 200 depicted in FIGS. 2-3.

This process may be performed after the process described in FIG. 5. In particular, the portable device used in FIG. 5 may be moved from the data management environment to a remote location, such as a maintenance environment, where access to the network is limited, unavailable, or unauthorized.

The process begins by initializing the visualization tool (operation 600). Next, the visualization tool receives user input through a graphical user interface (operation 602). The visualization tool identifies a selected part and a part identifier for the selected part based on the user input (operation 604). Next, the visualization tool uses the part identifier and a modified template to construct an initial locator (operation 606). The modified template may be implemented in a manner similar to modified template 348 in FIG. 3.

The initial locator is matched to a target locator in a table stored in a file system on a portable device (operation 608). Thereafter, requested engineering data for the selected part is retrieved from a physical location in the file system identified by the target locator by a local server (operation 610).

The requested engineering data is served to a browser (operation 612). The browser displays the requested engineering data on a display device for use by an operator in performing an operation on the selected part (operation 614), with the process terminating thereafter. In operation 614, the operation may be a maintenance operation.

Figure 7:
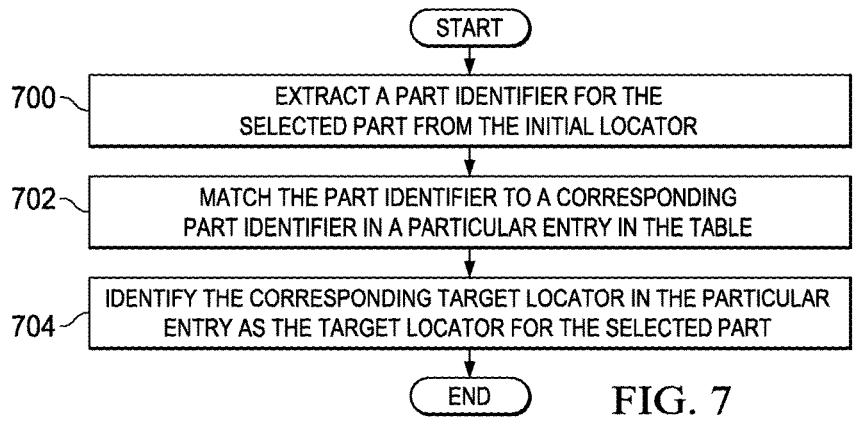
FIG. 7 is an illustration of a process for matching the initial locator to the target locator in the form of a flowchart in accordance with an illustrative embodiment.

With reference now to FIG. 7, an illustration of a process for matching the initial locator to the target locator is depicted in the form of a flowchart in accordance with an illustrative embodiment. The process illustrated in FIG. 7 may be implemented using mapper 312 in FIG. 3. This process may be used to implement operation 606 in FIG. 6.

The process may begin by extracting a part identifier for the selected part from the initial locator (operation 700). Next, the part identifier is matched to a corresponding part identifier in a particular entry in the table (operation 702). The corresponding target locator in the particular entry is identified as the target locator for the selected part (operation 704), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 8:
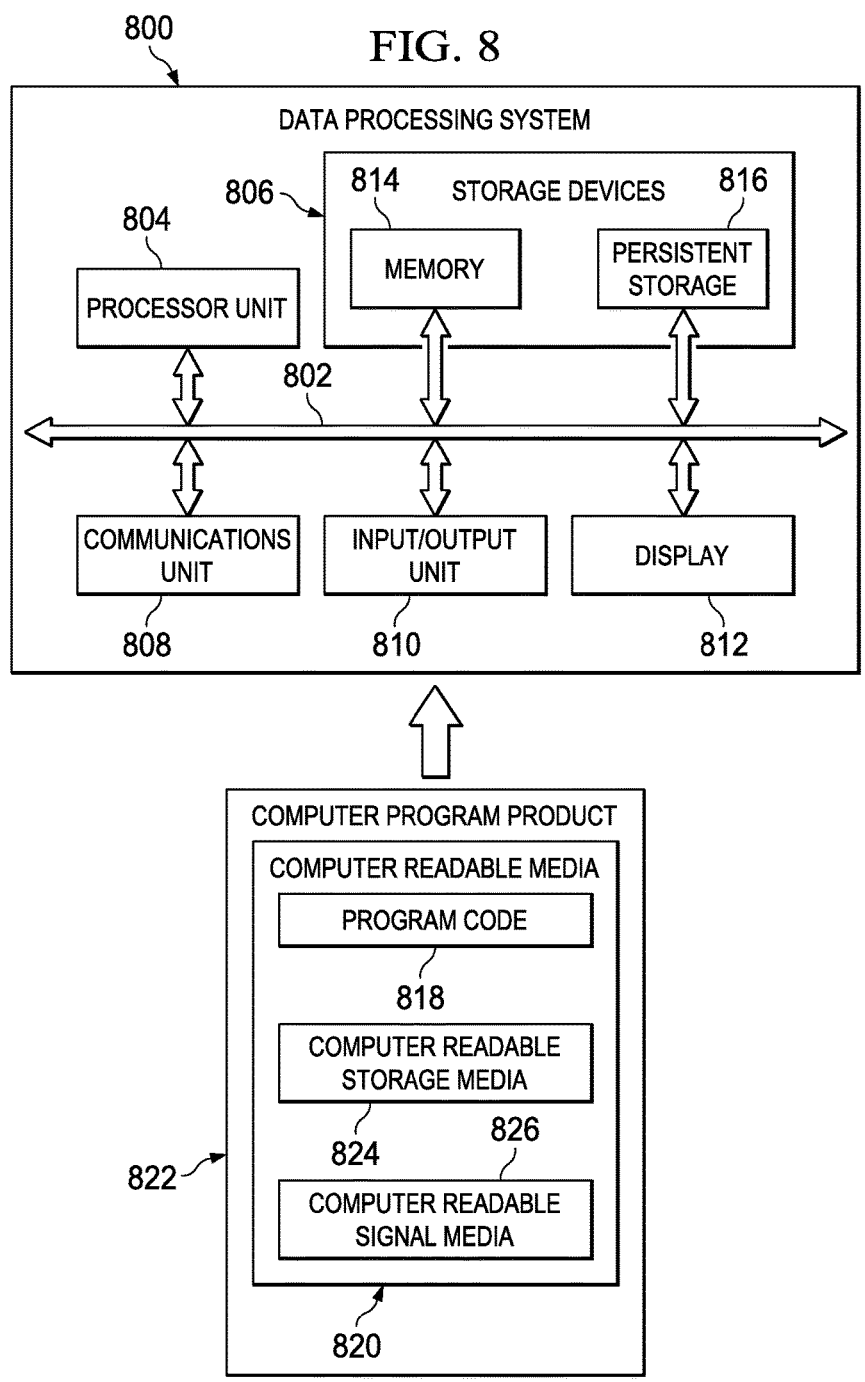
FIG. 8 is an illustration of a data processing system in the form of a block diagram in accordance with an illustrative embodiment.

Turning now to FIG. 8, an illustration of a data processing system is depicted in the form of a block diagram in accordance with an illustrative embodiment. Data processing system 800 may be used to implement remote data delivery system 200 in FIGS. 2-3.

For example, data processing system 800 may be an example of one manner in which portable device 232 in FIGS. 2-3 may be implemented. Further, depending on the implementation, data processing system 800 may be an example of one manner in which computer system 354, remote computer system 356, or both may be implemented.

As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise at least one of a number of processors, a multi-processor core, or some other type of processor, depending on the implementation. In some cases, processor unit 804 may take the form of a hardware unit, such as a circuit system, an application specific integrated circuit (ASIC), a programmable logic device, or some other suitable type of hardware unit.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Instructions for the operating system, applications and programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory, a rewritable optical disk, a rewritable magnetic tape, or some combination of the above. The media used by persistent storage 816 may or may not be removable.

In one illustrative example, portable device 232 in FIGS. 2-3 may be implemented in the form of persistent storage 816. For example, portable device 232 may take the form of an external hard drive, a flash memory drive, or some other type of persistent storage.

Communications unit 808 allows data processing system 800 to communicate with other data processing systems, devices, or both. Communications unit 808 may provide communications using physical communications links, wireless communications links, or both.

Input/output unit 810 allows input to be received from and output to be sent to other devices connected to data processing system 800. For example, input/output unit 810 may allow user input to be received through a keyboard, a mouse, some other type of input device, or a combination thereof. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, some other type of display device, or a combination thereof. Display 812 may be an example of one manner in which display device 302 in FIG. 3 may be implemented.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, or some other type of signal that can be transmitted over physical communications links, wireless communications links, or both.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in the form of a block diagram in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 911 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in the form of a block diagram in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In particular, remote data delivery system 200 from FIGS. 2-3 may be used to deliver engineering data for parts to a maintenance environment in which access to network 201 is poor, unavailable, or unauthorized during any one of the stages of aircraft manufacturing and service method 900. For example, without limitation, remote data delivery system 200 from FIGS. 2-3 may be used to deliver engineering data to portable device 232 for use in performing number of operations 222 during at least one of component and subassembly manufacturing 906, system integration 908, routine maintenance and service 914, or some other stage of aircraft manufacturing and service method 900.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of and reduce the cost of aircraft 1000.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
an integration visualization tool configured to:

receive a first user input that requests engineering data via a selection of a portion of a visualization of a product that comprises one of: an aircraft, an unmanned aerial vehicle, a spacecraft, a satellite, a ship, a submarine, or a ground vehicle;

generate a list that identifies, from a network server system, a set of parts for the portion; and cache visualization data for the portion from the network server system to a file system in a portable device;

a data retriever on the portable device, the data retriever configured to:

retrieve engineering data from the network server system, for each part in the set of parts; and store the engineering data for each part in the set of parts in a respective designated physical location in the file system on the portable device;

a table generator on the portable device, the table generator configured to create a set of entries for the set of parts such that each entry in the set of entries comprises a corresponding part identifier and a corresponding target locator that identifies the respective designated physical location of the engineering data in the file system, respectively, for each part in the set of parts;

a mapper on the portable device, the mapper configured to, respectively, match an initial locator constructed by the integration visualization tool to the corresponding target locator for each part from the set of parts; and a local server located on the portable device and configured to, with the portable device disconnected from the network server system:

receive a second user input that requests the engineering data for a selected part in the set of parts; and retrieve the engineering data for the selected part based on the respective designated physical location within the file system, of the engineering data for the selected part, identified; and serve the engineering data for the selected part to a browser, wherein the engineering data for the selected part is displayed in the browser for use in performing an operation on the selected part.

2. The apparatus of claim 1, wherein the operation is a maintenance operation selected from one of a repair operation, a rework operation, a replacement operation, a service operation, a testing operation, and an inspection operation.

3. The apparatus of claim 1, wherein the browser is configured to request the engineering data for the selected part from the local server using the initial locator and wherein the local server is configured to send the initial locator to the mapper.

4. The apparatus of claim 1, wherein the mapper is configured to extract the corresponding part identifier for the selected part from the initial locator, match the corresponding part identifier to a particular entry in a table, and identify the corresponding target locator in the particular entry as the corresponding target locator for the selected part.

5. The apparatus of claim 1 further comprising:

a template modifier configured to modify a template used by the integration visualization tool in response to a selected event by changing an identification of a network server to the local server such that the integration visualization tool constructs the initial locator for the selected part instead of a standard locator.

6. The apparatus of claim 1, wherein the mapper is configured to be implemented within the local server.

7. The apparatus of claim 1, wherein the corresponding target locator is a uniform resource locator and wherein the corresponding part identifier includes at least one of a part number, a revision number, or an instantiation identifier for the part.

8. The apparatus of claim 1 further comprising:

the integration visualization tool configured to identify the set of parts based on the first user input and construct the initial locator based upon a part identifier for the selected part and a modified template.

9. The apparatus of claim 8, wherein the selection of the portion comprises: a selection of a volume of a three-dimensional visualization of the product, or a number of parameters defining the volume of the three-dimensional visualization of the product.

10. The apparatus of claim 2, wherein the data retriever downloads onto the portable device only a portion of engineering data needed to perform the maintenance operation on the portion of an object structure or device.

11. The apparatus of claim 1, wherein all engineering data for the selected part is retrieved using only the part identifier and the corresponding target locator.

12. The apparatus of claim 1, wherein the set of parts is for one of a wing of the aircraft, a building, a machine, a robotic vehicle, a valve system, and a fuel system.

13. The apparatus of claim 1 wherein:

the engineering data includes at least one of design information, manufacturing and maintenance information, safety information, and engineering notes for the selected part;

the design information includes three-dimensional models of the part and at least one of tolerance information, part dimensions information, two-dimensional models of the part, a material profile of the part, or a chemical profile of the part and wherein the manufacturing and maintenance information includes at least one of assembly and disassembly requirements information, manufacturing and maintenance process information, or manufacturing and maintenance tools information; and all of the engineering data for the selected part is retrieved based solely on the corresponding part identifier for the selected part and the corresponding target locator identifying a physical location of engineering data for the selected part in the file system.

14. A remote data delivery system that comprises:

an integration visualization tool configured to:

receive a first user input that requests engineering data via a selection of a portion of a visualization of a product that comprises one of: an aircraft, an unmanned aerial vehicle, a spacecraft, a satellite, a ship, a submarine, or a ground vehicle;

generate a list that identifies, from a network server system, a set of parts for the portion; and cache visualization data for the portion from the network server system to a file system in a portable device;

a data retriever in the portable device and configured to:

retrieve engineering data for each part in the set of parts; and store the engineering data in the file system while the portable device is connected to the network server system;

a table generator in the portable device and configured to create a set of entries for the set of parts such that each entry in the set of entries comprises a corresponding part identifier and a corresponding target locator that identifies a physical location in the file system of the engineering data, respectively, for each part in the set of parts a local server located on the portable device and configured to, with the portable device disconnected from the network server system:

receive an initial locator constructed by the integration visualization tool, such that the local server comprises a mapper configured to, respectively, match the initial locator to the target locator for a selected part from the set of parts engineering data for the selected part:

receive a second user input that requests the engineering data for the selected part;

retrieve the engineering data for the selected part based on the physical location in the file system of the engineering data for the selected part, identified by the mapper and serve the engineering data for the selected part to a browser on the portable device; and a display device associated with the portable device and configured to display the engineering data for the selected part in the browser for use in performing a maintenance operation on the selected part.

15. The remote data delivery system of claim 14, wherein the integration visualization tool is configured to construct the initial locator using a part identifier for the selected part, a modified template, and at least one of a portion of a three-dimensional visualization, a volume of the three-dimensional visualization, and a number of parameters defining the volume of the three-dimensional visualization.

16. A method for remotely delivering engineering data to a portable device for use in performing an operation on a selected part, the method comprising:

receiving, in an integration visualization tool, a first user input requesting a portion of the engineering data via selecting a portion of a product that comprises one of: an aircraft, an unmanned aerial vehicle, a spacecraft, a satellite, a ship, a submarine, or a ground vehicle;

the integration visualization tool:
generating a list identifying, from a network server system, a set of parts for the portion; and
caching visualization data for the portion from the network server system onto the portable device;

receiving, responsive to a selected event, the list in a data retriever on the portable device;

the data retriever retrieving, from the network server system, engineering data for each part in the set of parts and storing, in a manner that allows the engineering data for each part in the set of parts to be easily accessible with the portable device disconnected from the network server system, in a file system on the portable device while the portable device is connected to the network server system, via storing the engineering data for each part in the set of parts in a respectively designated physical location in the file system;

forming a table in the file system via creating a set of entries for the set of parts such that each entry in the set of entries comprises a corresponding part identifier and a corresponding target locator identifying a physical location of the engineering data for each part, respectively for each part in the set of parts;

presenting, on the portable device, three-dimensional visualization of the portion of the product and receiving a second user input, in the integration visualization tool on the portable device, selecting the selected part from the set of parts in the portion of the product;

the integration visualization tool constructing an initial locator for the selected part via modifying, responsive to a second selected event, a standard locator identifier for the selected part on the network server system, and sending the initial locator to a mapper in a local server on the portable device;

matching the initial locator to a target locator, in the file system, for the selected part, such that the target locator identifies the physical location, within the file system, of the engineering data for the selected part;

retrieving, by the local server when the portable device is disconnected from the network server system, the engineering data for the selected part based on the physical location, within the file system, identified on the portable device; and serving, by the local server, the engineering data for the selected part to a browser of the portable device; and displaying the engineering data for the selected part in the browser for use in performing the operation on the selected part.

17. The method of claim 16 further comprising:
performing the operation on the selected part, wherein the operation is a maintenance operation selected from one of a repair operation, a rework operation, a replacement operation, a service operation, a testing operation, and an inspection operation.

18. The method of claim 16, wherein matching the initial locator constructed by the integration visualization tool to the target locator in the table for the selected part comprises:
extracting a part identifier for the selected part from the initial locator;
matching the part identifier to a particular entry in the table; and
identifying the corresponding target locator in the particular entry as the target locator for the selected part.

19. The method of claim 16 further comprising:
sending, by the browser, the second user input for the engineering data for the selected part to the local server using the initial locator; and
sending, by the local server, the initial locator to the mapper.

20. The method of claim 16 further comprising:
modifying a template used by the integration visualization tool such that the integration visualization tool constructs the initial locator for the selected part instead of a standard locator.

21. The method of claim 16, wherein creating the set of entries for the set of parts to form the table in the file system comprises:
creating the entry with the corresponding part identifier and the corresponding target locator, wherein the corresponding part identifier includes at least one of a part number, a revision number, or an instantiation identifier for the part.

22. The method of claim 16 further comprising:
identifying, by the integration visualization tool, the set of parts based on user input entered by a user.

23. The method of claim 16 further comprising:
constructing, by the integration visualization tool, the initial locator using a part identifier for the selected part and a modified template.

24. The method of claim 16 wherein:
the portion of the engineering data requested includes design information, manufacturing and maintenance information, and safety information, and engineering notes for the selected part;

the design information includes three-dimensional models of the part and at least one of tolerance information, part dimensions information, two-dimensional models of the part, a material profile of the part, or a chemical profile of the part and wherein the manufacturing and maintenance information includes at least one of assembly and disassembly requirements information, manufacturing and maintenance process information, or manufacturing and maintenance tools information; and all of the engineering data for the selected part is retrieved based solely on the corresponding part identifier for the selected part and the corresponding target locator identifying the physical location, of the engineering data for the selected part, in the file system.

* * * * *